US010345476B2

(12) United States Patent
Wu

(10) Patent No.: US 10,345,476 B2
(45) Date of Patent: Jul. 9, 2019

(54) FRACTURE DETECTION METHOD USING MULTI-AXIAL INDUCTION TOOL

(71) Applicant: Schlumberger Technology Corporation, Sugar Land, TX (US)

(72) Inventor: Peter T. Wu, Missouri City, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 254 days.

(21) Appl. No.: 15/104,051

(22) PCT Filed: Dec. 12, 2014

(86) PCT No.: PCT/US2014/070132
§ 371 (c)(1),
(2) Date: Jun. 13, 2016

(87) PCT Pub. No.: WO2015/089464
PCT Pub. Date: Jun. 18, 2015

(65) Prior Publication Data
US 2016/0320517 A1 Nov. 3, 2016

Related U.S. Application Data

(60) Provisional application No. 61/916,042, filed on Dec. 13, 2013.

(51) Int. Cl.
*G01V 3/30* (2006.01)
*G01V 3/28* (2006.01)
(Continued)

(52) U.S. Cl.
CPC ............... *G01V 3/28* (2013.01); *G01V 3/30* (2013.01); *G01V 3/38* (2013.01)

(58) Field of Classification Search
CPC ..... G01V 3/28; G01V 3/30; G01V 3/38; G01V 3/18; G01V 3/34; E21B 47/18; E21B 49/00; E21B 47/00
See application file for complete search history.

(56) References Cited

U.S. PATENT DOCUMENTS 6,798,208 B2    9/2004  Omeragle
6,924,646 B2    8/2005  Omeragle
(Continued)

FOREIGN PATENT DOCUMENTS

WO    2011002863 A2    1/2011

OTHER PUBLICATIONS

Wu et al, "Efficient Hierarchical Processing and Interpretation of Triaxial Induction Data in Formations with Changing Dip," SPE 135442, Sep. 19-22, 2010, 14 pages, SPE Technical Conference and Exhibition, Florence, Italy.
(Continued)

*Primary Examiner* — Neel D Shah
*Assistant Examiner* — Brent J Andrews
(74) *Attorney, Agent, or Firm* — Michael Dae

(57) ABSTRACT

A method for identifying fractures from measurements made by a multi-axial electromagnetic induction tool in a wellbore traversing subsurface formations includes determining a value of a fracture orientation indicator from in line components of the multi-axial electromagnetic induction measurements made transverse to a tool axis, and parallel to the tool axis. The tool axis is substantially parallel to a bedding plane of the subsurface formations. A value of a vertical fracture indicator is determined using the in line components of the multi-axial electromagnetic induction measurements made transverse to the tool axis, and parallel to the tool axis.

20 Claims, 6 Drawing Sheets

(51) Int. Cl.
    *G01V 3/38*     (2006.01)
    *E21B 47/00*     (2012.01)
    *E21B 47/18*     (2012.01)
    *E21B 49/00*     (2006.01)

(56) References Cited

U.S. PATENT DOCUMENTS

| | | |
|---|---|---|
| 6,937,021 B2 | 8/2005 | Rosthal |
| 7,359,800 B2 | 4/2008 | Rabinovich et al. |
| 8,478,530 B2 | 7/2013 | Rabinovich et al. |
| 9,274,242 B2 | 3/2016 | Wu |
| 2005/0168349 A1 | 8/2005 | Huang et al. |
| 2010/0004866 A1* | 1/2010 | Rabinovich .............. G01V 3/28 702/7 |
| 2012/0065889 A1* | 3/2012 | Wu .......................... G01V 3/28 702/11 |
| 2012/0109527 A1 | 5/2012 | Bespalov et al. |
| 2014/0078288 A1 | 3/2014 | Wu |

OTHER PUBLICATIONS

International Search Report and Written Opinion issued in PCT/US2014/070132 dated Mar. 20, 2015; 17 pages.
Wu et al, U.S. Appl. No. 60/950,708, "Real-Time Anisotropy, Dip, Azimuth, Resitivity (Radar) Processing of Tri-Axial Induction Measurements" filed Jul. 19, 2007.

\* cited by examiner

X and Z are axes of the coordinate system fixed on the borehole

Y axis is perpendicular to X and Z in the direction out of the paper (right-hand-rule)

θ and φ are the relative dip and dip azimuth of the formation
decc is the eccenter distance
Ψ is the azimuth of eccenter

FRACTURE DETECTION METHOD USING MULTI-AXIAL INDUCTION TOOL

CROSS-REFERENCE TO RELATED APPLICATION

This application claims priority to U.S. Provisional Patent Application Ser. No. 61/916,042 filed on Dec. 13, 2013, the contents of which are incorporated herein for all purposes.

BACKGROUND

This disclosure relates generally to the field of subsurface formation fracture evaluation. More specifically, the disclosure relates to techniques for detecting fractures having a planar orientation substantially perpendicular to a wellbore using multi-axial electromagnetic induction well logging instruments.

A multi-axial electromagnetic induction well logging instrument such as a triaxial electromagnetic induction well logging instrument sold under the trademark RT SCANNER, which is a trademark of Schlumberger Technology Corporation, Sugar Land, Texas, measures 9-component apparent conductivity tensors ($\sigma m(i, j, k)$, $i, j=x, y, z$) at a plurality of receiver spacings from a transmitter, wherein each spacing is represented by the index k. FIG. 2 schematically illustrates such a tri-axial tool 10 and the component tensor measurement C. The instrument 10 may include one or more multi-axial electromagnetic transmitters T disposed on the instrument 10, and have one or more multi-axial electromagnetic receivers (each receiver usually consisting of a main receiver RM and a balancing or "bucking" receiver RB to attenuate direct induction effects) at one or more axially spaced apart positions along the longitudinal axis z of the tool 10. The RT SCANNER instrument uses triaxial transmitters and receivers, wherein the transmitters and receivers have three, mutually orthogonal coils having magnetic dipole axes oriented along the tool axis z and along two other mutually orthogonal directions shown at x and y. The instrument measurements in the present example may be obtained in the frequency domain by energizing the transmitter T with a continuous wave (CW) alternating current having one or more discrete frequencies (using more than one discrete frequency may enhance the signal-to-noise ratio). However, measurements of the same information content may also be obtained using time domain signals through a Fourier decomposition process by energizing the transmitter T with one or more types of transient currents. This is a well known physics principle of frequency-time duality. Voltages induced in each coil of one of the receivers RM/RB is shown in the tensor C represented by the voltage V with a two letter subscript as explained above representing the axis (x, y or z) of the transmitter coil used and the axis of the receiver coil (x, y or z) used to make the particular voltage measurements. The voltage measurements in tensor C may be processed to obtain the described apparent conductivity tensors. Subsurface formation properties, such as horizontal and vertical conductivities ($\sigma h$, $\sigma v$) or their inverse, horizontal and vertical resistivities (Rh, Rv), relative dip angle ($\theta$) and the dip azimuthal direction ($\Phi$), as well as borehole/tool properties, such as drilling fluid (mud) conductivity ($\sigma mud$), wellbore diameter (hd), tool eccentering distance (decc), tool eccentering azimuthal angle ($\psi$), all affect the measurements of voltages used to determine the conductivity tensors.

FIG. 3A illustrates a top view, and FIG. 3B shows an oblique view of an eccentered tool 10 in a wellbore 12 drilled through an anisotropic formation F with a non-zero dip angle ($\theta$). Eccentering of the tool 10 is shown by decc and the azimuthal angle of the dip azimuth is represented by ($\psi$). The tool 10 eccentering azimuthal angle is shown by $\psi$. FIG. 3C shows vertical and horizontal conductivity determinable with the tool of FIGS. 3A and 3B with reference to a dip angle between formation layering and a wellbore (and corresponding tool) longitudinal axis. The above description is to provide a frame of reference to understand an example method according to the present disclosure.

Using a simplified model of layered anisotropic formation traversed obliquely by the wellbore 12, the response of the conductivity tensors depends on the above eight parameters in a very complex manner. The effects of the wellbore and instrument orientation and position on the measured conductivity tensors may be very large even in wellbores having substantially electrically nonconductive fluid therein, e.g., oil base mud (OBM). Through one of several known inversion techniques the above wellbore and formation parameters can be calculated and borehole effects can be removed from the measured conductivity tensors to determine values of horizontal and vertical resistivities (Rh, Rv), relative dip angle ($\theta$) and the dip azimuthal direction ($\Phi$).

The formation parameters (vertical and horizontal conductivities, dip and dip azimuth) may be displayed substantially in real-time (as computed by a processor near the wellbore, see FIG. 1A and FIG. 1B) to help make various decisions related to the drilling and completion of the wellbore. The resistivities (the inverse of conductivities) of the subsurface formations determinable by a tool such as illustrated in FIG. 2 are known in the art to be used, for example, to delineate low resistivity laminated hydrocarbon bearing formations. The dip and dip azimuth are known to be used to map the structure of the formations in a scale much finer than that provided by, e.g., surface reflection seismic.

One of the important items of information that may affect the drilling and completion decisions of any particular wellbore is whether the wellbore has traversed significant fractured zones. Fractures may occur in some formations due to tectonic forces acting over geological time. Fractures can also be induced in some formations by the drilling operation. Large fracture systems can sometimes be a principal factor that enables economically useful production of oil and/or gas from a particular wellbore. Large fracture systems traversed by a wellbore could also cause loss of drilling mud. Accordingly, knowing the location of the fracture zone and the fracture plane orientation can significantly improve the drilling and completion decision.

Fractures with large planar extent, even if very thin, filled with non-conductive fluid, such as connate oil and/or oil based drilling fluid may block the induced current in the formation resulting from electromagnetic induction effects of energizing the transmitter T on the tool and could produce significant anomalies in the inverted formation parameters compared with those from the same formation without fractures. The size of such anomalies may depend on the formation resistivities (Rh, Rv), the size of the fracture plane, and the relative dip and azimuth between the fracture plane and the layering structure of the formation, among other factors. If the fracture plane is nearly parallel to the layering structure of the formation, the effects of the fracture on measurements made by an instrument such as shown in FIG. 2 may be relatively small. On the other hand, if the fracture plane is perpendicular to the layering structure of the formation, the effect of the fracture may dominate the response of the tool. A fracture system often encountered by wellbores is that of substantially horizontal layered formations with vertical fractures. Accordingly, techniques for characterizing such fractures using multi-axial (e.g., triaxial) electromagnetic induction measurements may be useful in this regard.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method according to one aspect for identifying fractures from measurements made by a multi-axial electromagnetic induction tool in a wellbore traversing subsurface formations includes determining a value of a fracture orientation indicator from in line components of the multi-axial electromagnetic induction measurements made transverse to a tool axis, and parallel to the tool axis. The tool axis is substantially parallel to a bedding plane of the subsurface formations. A value of a vertical fracture indicator is determined using the in line components of the multi-axial electromagnetic induction measurements made transverse to the tool axis, and parallel to the tool axis.

Other aspects and advantages will be apparent from the description and claims which follow.

BRIEF DESCRIPTION OF THE DRAWINGS

Certain embodiments are described below with reference to the following figures.

DETAILED DESCRIPTION

Figure 1A:
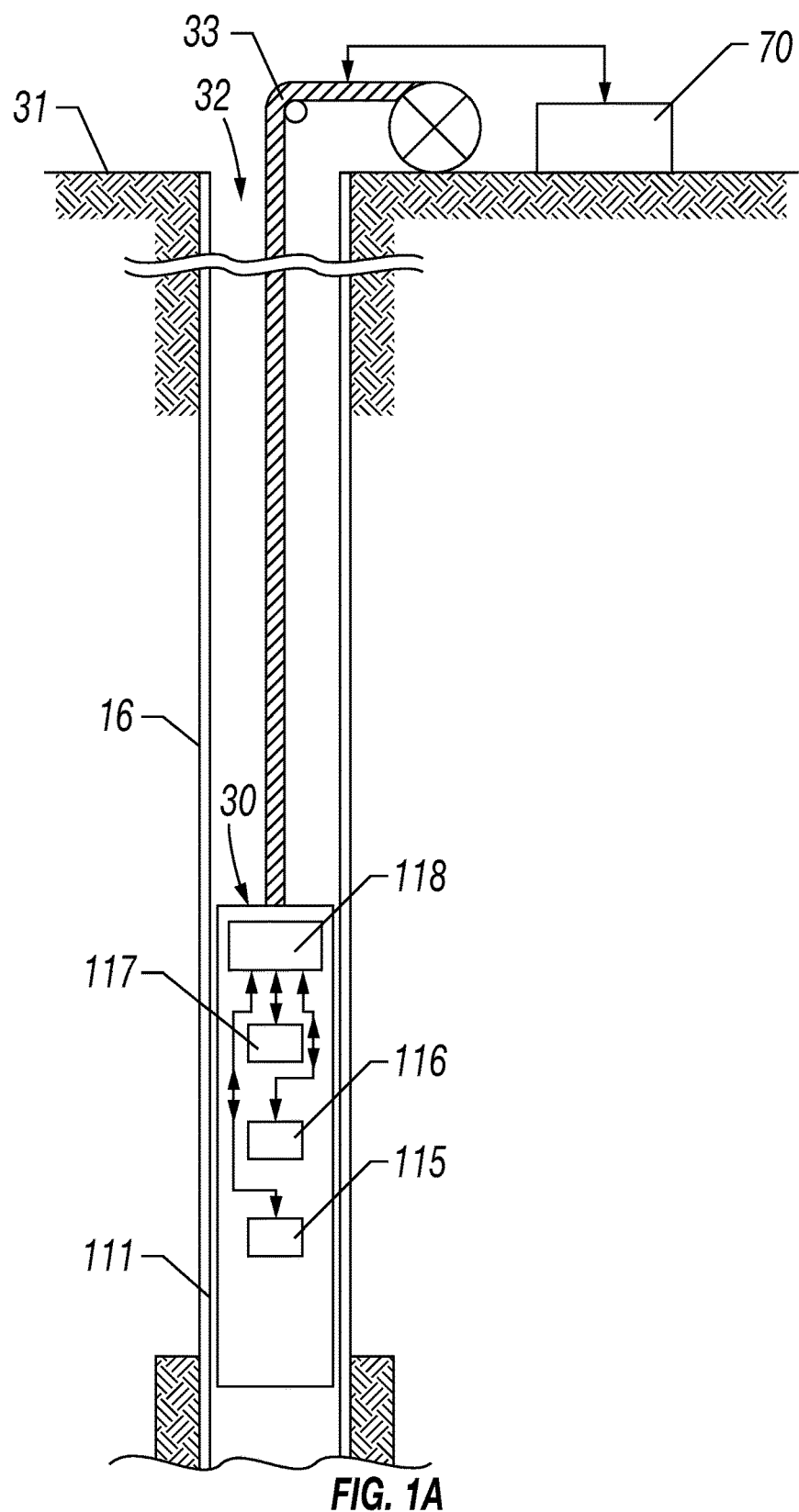
FIG. 1A shows an example wireline conveyed multi-axial electromagnetic well logging instrument disposed in a wellbore drilled through subsurface formations.

FIG. 1A shows an example multi-axial electromagnetic well logging instrument 30. The measurement components of the instrument 30 may be disposed in a housing 111 shaped and sealed to be moved along the interior of a wellbore 32. The well logging instrument 30 may, in a form hereof, be of a type sold under the trademark RT SCAN- NER, which is a trade mark of Schlumberger Technology Corporation, Sugar Land, Tex.

The instrument housing 111 may contain at least one multi-axial electromagnetic transmitter 115, and two or more multi-axial electromagnetic receivers 116, 117 each disposed at different axial spacings from the transmitter 115. The transmitter 115, when activated, may emit a continuous wave electromagnetic field at one or more selected frequencies. Shielding (not shown) may be applied over the transmitter 115 and the receivers 116, 117 to protect the antenna coils which are deployed near the outer layer of the tool. The detectors 116, 117 may be multi-axis wire coils each coupled to a respective receiver circuit (not shown separately). Thus, detected electromagnetic energy may also be characterized at each of a plurality of distances from the transmitter 115.

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the receivers 116, 117 may be processed by suitable circuitry 118 for transmission along the cable 33 to the recording system 70. The recording system 70 may include a computer as will be explained below for analysis of the detected signals as well as devices for recording the signals communicated along the cable 33 from the instrument 30 with respect to depth and/or time.

The well logging tool described above can also be used, for example, in logging-while-drilling ("LWD") equipment. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, preferably near the drill bit 216. The BHA 236 may include subassemblies for making measurements, processing and storing information and for communicating with the Earth's surface. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions.

Figure 1B:
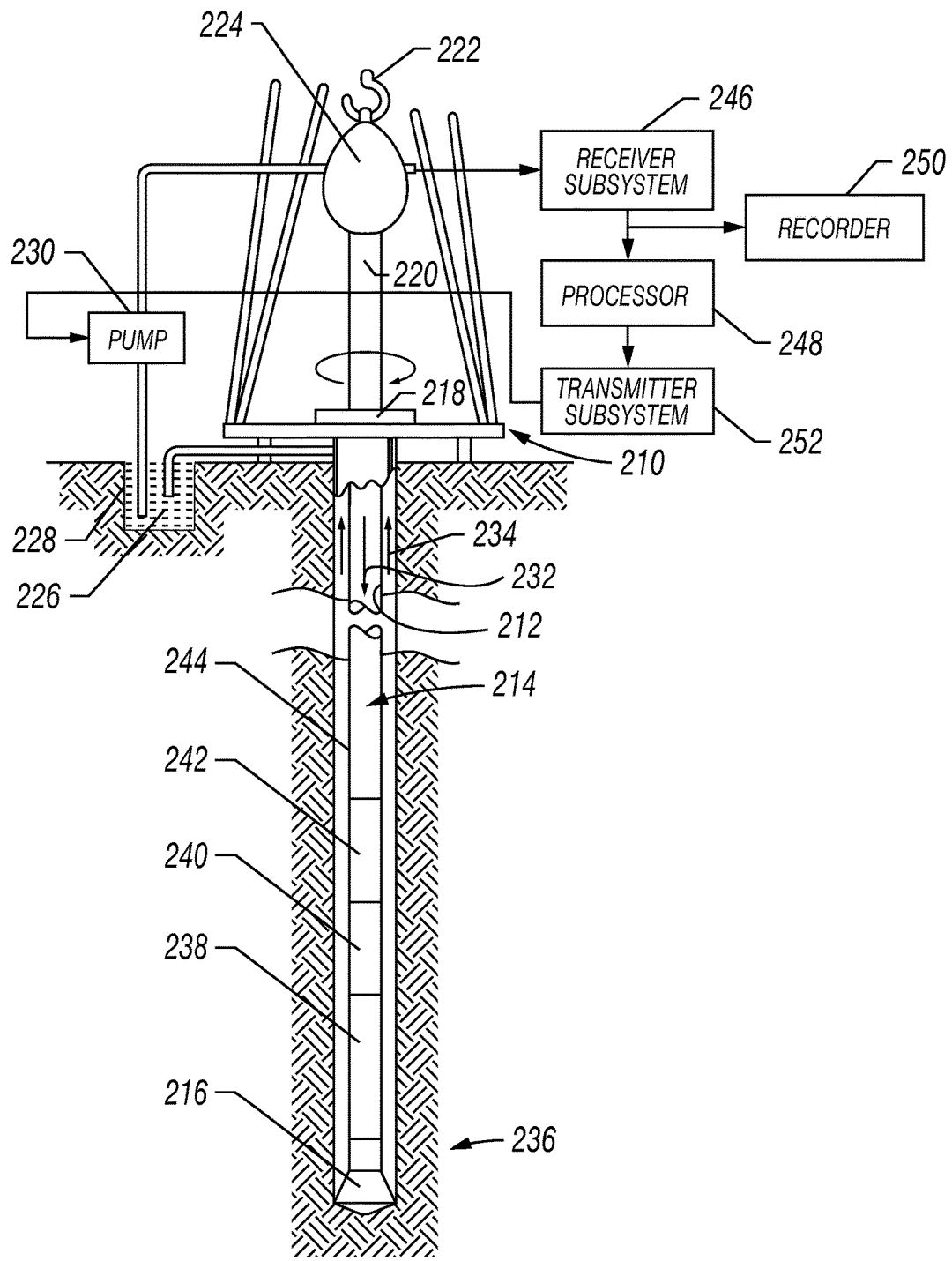
FIG. 1B shows an example well logging instrument system that may be used during wellbore drilling.

In the arrangement shown in FIG. 1B, the components of multi-axial induction well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 can also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. The data may also be stored downhole and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

Figure 2:
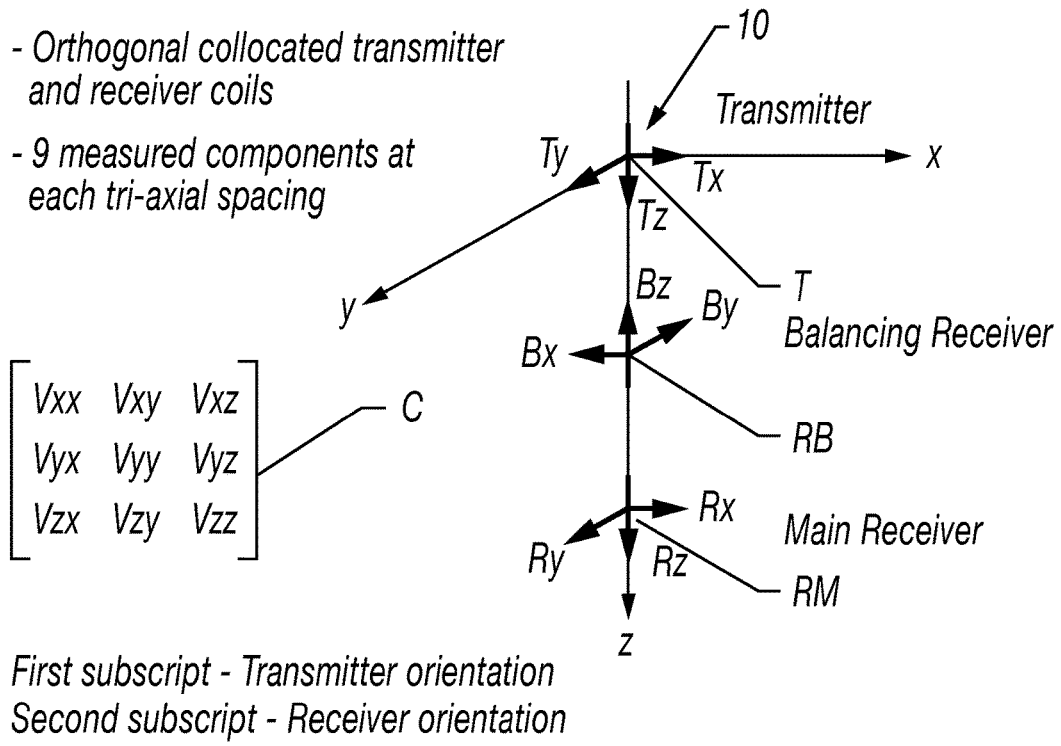
FIG. 2 shows an illustration of a multi-axial (e.g., triaxial) induction array measurement devices (transmitter and receivers) at a given spacing between the transmitter and each receiver.
Figure 3A:
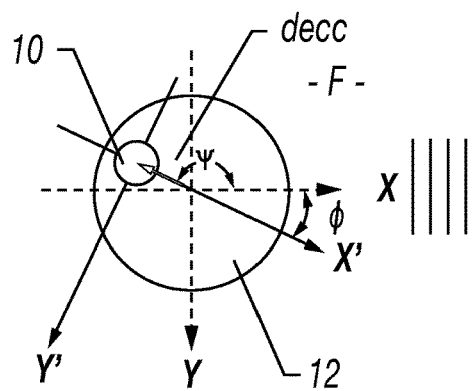
FIG. 3A shows schematically a top view of an eccentered multi-axial induction tool in a wellbore passing through an anisotropic formation at a relative dip angle.
Figure 3B:
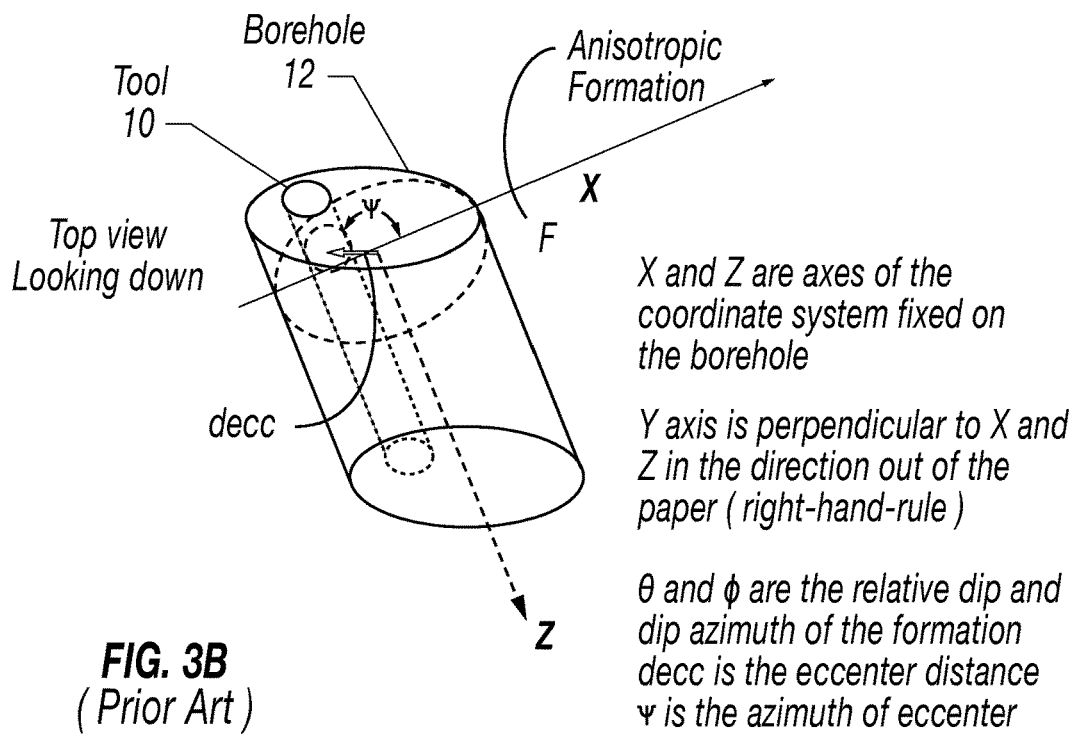
FIG. 3B shows an oblique view of the eccentered tool shown in FIG. 3A.
Figure 3C:
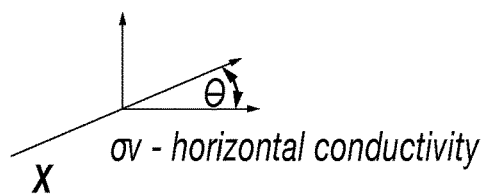
FIG. 3C shows vertical and horizontal conductivity determinable with the tool of FIGS. 3A and 3B with reference to a dip angle between formation layering and a wellbore (and corresponding tool) longitudinal axis.

While the description that follows is based on measurements made from a tool such as the RT SCANNER tool described with reference to FIG. 2 in which each of the transmitter and receivers comprises three, mutually orthogonal induction coils with one coil being aligned with the tool's longitudinal axis, it is to be understood that for purposes of defining the scope of the disclosure, any induction well logging instrument with multi-axial transmitter(s) and receiver(s) having magnetic dipole axes along other directions and in other than three magnetic dipole axis elements (e.g., coils) per transmitter or receiver may be used provided that for each such transmitter and receiver it is possible to resolve three mutually orthogonal components of the transmitted electromagnetic field and the received electromagnetic field and where such resolved components are susceptible to either or both mechanical (physically embodied) or mathematical rotation to any selected coordinate system, e.g., Cartesian or cylindrical.

Figure 4:
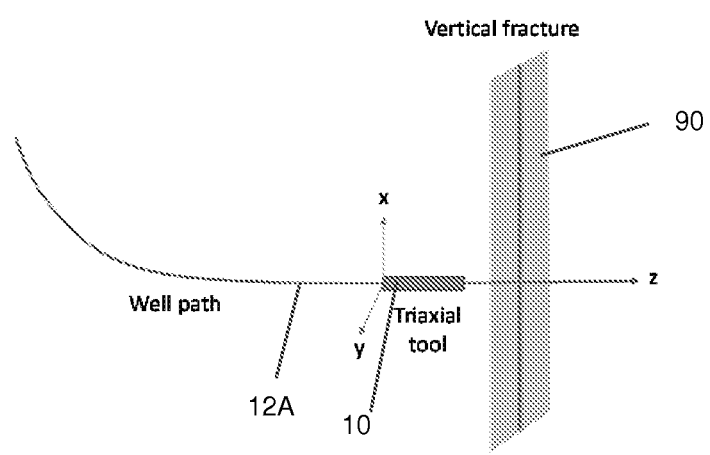
FIG. 4 shows schematically a triaxial induction well logging tool moving through a substantially horizontal wellbore that intersects a substantially vertical fracture.

FIG. 4 is a schematic of a substantially vertical fracture 90 and a triaxial induction tool 10 as explained above disposed in a nearly or actually horizontal wellbore 12A that penetrates the fracture 90. x, y, z denote the three orthogonal directions of the magnetic moment of the triaxial transmitter(s) and receivers on the triaxial induction tool 10. For purposes of explaining an example method according to the present disclosure, the z-direction is in line with the tool and the wellbore axes. The x-direction is assumed to be pointed upward or in the top-of-the-hole direction. The y-direction is co-planar with the x-direction and follows the right-hand rule of the standard Cartesian coordinate system. The background formation is assumed to be of uniform composition and is electrically anisotropic. Here, isotropic formation may be considered as a subset of anisotropic formation for which the horizontal and vertical resistivities have equal value (Rh=Rv). The fracture 90 plane is assumed to be much larger than the diameter of the well logging tool 10. It will be appreciated by those skilled in the art that using a logging while drilling system such as explained with reference to FIG. 1B may enable the system operator to orient the transmitter(s) and receivers on the well logging tool so that their orientation is along the directions explained above. It is also possible to use some or all of the nine component tensor measurements to resolve certain measurement components from the 9 component measurement tensor as will be explained below. The tool's axis is assumed to be substantially perpendicular to the long dimension of the fracture plane. The z-axis of the tool may intersect the fracture plane at any arbitrary angle, which angle may be determined as explained below.

As an example, selected components for fracture detection in the present example horizontal well configuration may be $\sigma yy$, $\sigma zz$, and $\sigma yy\_45$. Here, $\sigma yy\_45$ is the $\sigma yy$ component of the measured apparent conductivity tensor mathematically rotated 45 degrees around the x-axis. In the present context, a measurement made using a transmitter and a receiver with their magnetic moments oriented in the same direction may be referred to as an "in-line" measurement. Correspondingly, when the transmitter direction is different from the receiver direction, such measurement may be referred to as a "crossline" measurement.

Using these above signal components, it is possible to derive two indicators for detection of vertical fractures (VFIND for vertical fracture indicator) and the fracture strike orientation (FOI for fracture orientation indicator) using the following expressions:

$$FOI=0.5*\tan^{-1}[(2*\sigma yy\_45-(\sigma zz+\sigma yy))/(\sigma yy-\sigma zz)] \quad (1)$$

$$VFIND=ABS(0.5*(\sigma yy-\sigma zz)/[\partial+\cos(2*FOI)]) \quad (2)$$

The parameter $\partial$ in equation (2) is a very small constant used for the purpose of preventing the denominator from being zero. ABS( ) is the function symbol for taking absolute value of the expression within the parentheses. In the case where measurements are made with the x-axis transmitter(s) and receivers oriented other than vertically, and correspondingly the y-axis transmitter(s) and receiver oriented other than horizontally, well known trigonometric relationships may be used to determine the $\sigma yy\_45$, $\sigma zz$ and $\sigma yy$ measurement components used in the two above equations.

FOI in equation (1) is a fracture orientation indicator. It indicates the strike direction of the fracture, which in the present example may be defined as the angle subtended between the fracture plane and the wellbore/tool axis or z direction. If the geomagnetic or geodetic orientation of the logging tool axis is determined, the FOI may be referenced to geomagnetic and/or geodetic direction.

VFIND in equation (2) is a vertical fracture indicator. VFIND is primarily a function of the following parameters:

FA—fracture aperture
FD—fracture displacement
FW—fracture width
FH—fracture height
Rh—formation horizontal resistivity
Rv—formation vertical resistivity
Dip—the dip angle of the anisotropy For a given value of Rh, Rv, and Dip, VFIND becomes an indicator of the size of the fracture (FW×FH), FA, and FD. The 9-component electromagnetic induction measurements from each of a plurality of multi-axial receivers may be processed by a zero-D model inversion to obtain background formation information. By way of example only, one type of zero-D inversion process is described in Wu, P., Wang, G., and Barber, T., *Efficient hierarchical processing and interpretation of triaxial induction data in formations with changing dip*, paper SPE 135442 presented at the SPE Annual Technical Conference and Exhibition, Florence, Italy, Sep. 19-22, 2010. The zero-D inversion may output, at each depth index n, formation horizontal resistivity, vertical resistivity, dip angle, and dip azimuth ($Rh_n$, $Rv_n$, $Dip_n$, and $Az_n$, respectively). The foregoing values may be computed when the value of VFIND falls below a selected threshold, i.e., when the tool is far enough away from any vertical fractures to have a substantial effect on the component tensor measurements. For purposes of defining the scope of the present disclosure, it is believed that having the tool longitudinal axis (z axis) subtend an angle of at most about 30 degrees with respect to the orientation of the long dimension of the fracture plane will still provide useful results.

Figure 5:
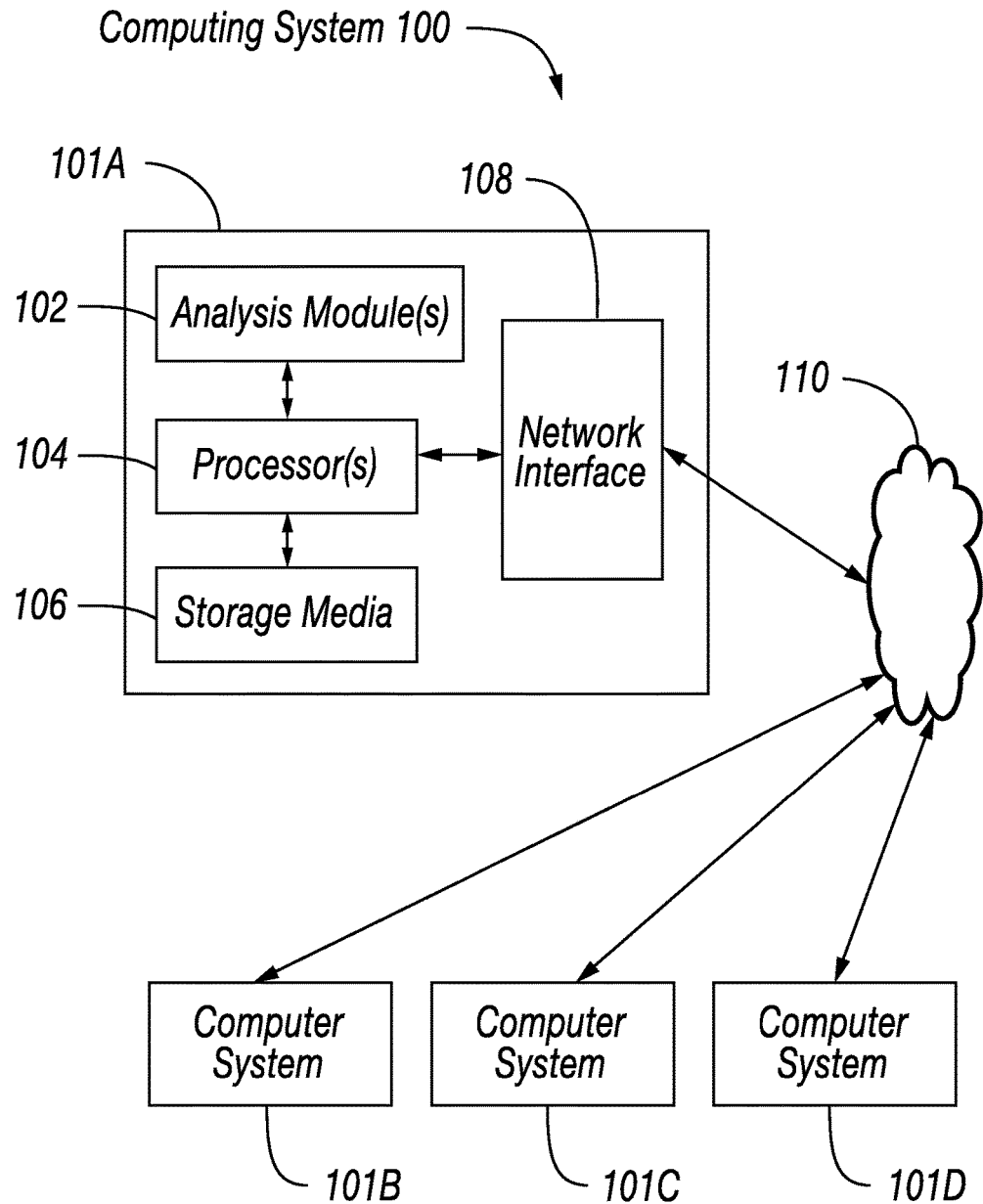
FIG. 5 shows an example computer system.

The foregoing computations may be performed on a computer system such as one shown in the processor at 248 in FIG. 1B, or in the surface unit 70 in FIG. 1A. However, any computer or computers may be used to equal effect. FIG. 5 depicts an example computing system 100 in accordance with some embodiments for carrying out example methods such as those explained above. The computing system 100 can be an individual computer system 101A or an arrangement of distributed computer systems. The computer system 101A includes one or more analysis modules 102 that are configured to perform various tasks according to some embodiments, such as the tasks described above with reference to FIG. 4. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more non-transitory computer-readable or machine-readable storage media. Note that while in the embodiment of FIG. 5 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 5, and/or computing system 100 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the methods described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying fractures from measurements made by a multi-axial electromagnetic induction tool in a wellbore traversing subsurface formations, comprising:
    disposing a multi-axial electromagnetic well logging tool along a wellbore traversing subsurface formations, the tool comprising at least one multi-axial electromagnetic transmitter and at least one multi-axial electromagnetic receiver disposed along an axis of the tool;
    measuring multi-component tensor elements corresponding to a plurality of voltages via the tool, wherein the plurality of voltages comprises:

a first voltage determined based on a first measurement made with a first set of in line components of the at least one multi-axial electromagnetic transmitter and the at the least one multi-axial electromagnetic receiver, wherein the first measurement is made transverse to the axis of the tool;

a second voltage determined based on a second measurement made with a second set of in line components of the at least one multi-axial electromagnetic transmitter and the at least one multi-axial electromagnetic receiver, wherein the second measurement is made parallel to the axis of the tool, wherein the axis of the tool is substantially parallel to a bedding plane of the subsurface formations;

determining a rotated tensor component by rotating the first voltage about an axis substantially perpendicular to the axis of the tool;

determining a value of a fracture orientation indicator based on the plurality of voltages and a multiple of the rotated tensor component, wherein determining the value of the fracture orientation indicator comprises subtracting a sum of the first voltage and the second voltage from the multiple of the rotated tensor component; and determining a value of a vertical fracture indicator indicative of a size of a vertical fracture based on the first voltage, the second voltage, and the value of the fracture orientation indicator.

2. The method of claim 1 wherein the first measurement is made in a plane substantially parallel to the tool axis.

3. The method of claim 1 wherein measuring the multi-component tensor elements comprises energizing the at least one multi-axial electromagnetic transmitter and detecting the plurality of voltages in the at least one multi-axial electromagnetic receiver.

4. The method of claim 3 wherein at least one axis of the at least one multi-axial electromagnetic transmitter and the at least one multi-axial electromagnetic receiver are substantially along a same direction as the axis of the tool.

5. The method of claim 1 further comprising moving the tool along the wellbore and repeating the determining the value of a fracture orientation indicator and determining the value of the vertical fracture indicator for a plurality of subsurface formations.

6. The method of claim 1 further comprising determining vertical resistivity, horizontal resistivity and dip orientation of the subsurface formations when the vertical fracture indicator falls below a selected threshold.

7. The method of claim 1 wherein determining the rotated tensor component comprises mathematically rotating the second voltage 45 degrees about the axis substantially perpendicular to the axis of the tool.

8. A method for well logging, comprising:
moving a multi-axial electromagnetic well logging tool along a wellbore traversing subsurface formations, the tool comprising at least one multi-axial electromagnetic transmitter and at least one multi-axial electromagnetic receiver disposed at a spaced apart position along an axis of the tool;

measuring multi-component tensor elements corresponding to a plurality of voltages, wherein each of the plurality of voltages corresponds to a voltage induced in an axial component of the at least one multi-axial electromagnetic receiver resulting from energizing an axial component of the at least one multi-axial transmitter, wherein the plurality of voltages comprises:

a first voltage determined based on a first measurement made with a first set of in line components of the at least one multi-axial electromagnetic transmitter and the at the least one multi-axial electromagnetic receiver, wherein the first measurement is made transverse to a tool axis;

a second voltage determined based on a second measurement made with a second set of in line components of the at least one multi-axial electromagnetic transmitter and the at least one multi-axial electromagnetic receiver, wherein the second measurement is made parallel to the tool axis, wherein the tool axis is substantially parallel to a bedding plane of the subsurface formations;

in a computer, determining a value of a fracture orientation indicator based on the first voltage and the second voltage and a multiple of the rotated tensor component, wherein determining the value of the fracture orientation indicator comprises subtracting a sum of the first voltage and the second voltage from the multiple of the rotated tensor component; and in the computer, determining a value of a vertical fracture indicator indicative of a size of a vertical fracture based on the first voltage, the second voltage, and the value of the fracture orientation indicator.

9. The method of claim 8 wherein the first measurement is made in a plane substantially parallel to the tool axis.

10. The method of claim 8 wherein measuring the multi-component tensor elements comprises energizing at least one multi-axial electromagnetic transmitter and detecting the plurality of voltages in the at least one multi-axial electromagnetic receiver.

11. The method of claim 10 wherein at least one axis of the at least one multi-axial electromagnetic transmitter and the at least one multi-axial electromagnetic receiver are substantially along a same direction as the axis of the tool.

12. The method of claim 10 further comprising moving the tool along the wellbore and repeating the determining the value of a fracture orientation indicator and determining the value of the vertical fracture indicator for a plurality of subsurface formations.

13. The method of claim 10 further comprising determining vertical resistivity, horizontal resistivity and dip orientation of the subsurface formations when the vertical fracture indicator falls below a selected threshold.

14. The method of claim 10 wherein moving the tool comprises extending an armored electrical cable into and/or withdrawing the armored electrical cable out of the wellbore.

15. The method of claim 10 wherein moving the tool comprises moving a drill string along the wellbore.

16. The method of claim 15 wherein the moving the drill string comprises lengthening the wellbore by rotating a drill bit at an end of the drill string.

17. A system, comprising:
at least one multi-axial electromagnetic transmitter;
at least one multi-axial electromagnetic receiver;
means for energizing the at least one electromagnetic transmitter to induce a multi-axial electromagnetic field in formations surrounding the at least one transmitter and at least one receiver; and
a processor configured to:
calculate a horizontal in line component measurement of a first induced voltage at the at least one multi-axial electromagnetic receiver in a direction parallel to a longitudinal separation of the at least one multi-axial electromagnetic transmitter and the at least one multi-axial electromagnetic receiver;

calculate a second induced voltage at the at least one multi-axial electromagnetic receiver in a direction transverse to the longitudinal separation;

calculate a rotated tensor component by rotating the second induced voltage about a first axis substantially perpendicular to a second axis corresponding to the longitudinal separation;

calculate a value of a fracture orientation indicator indicative of an orientation of a fracture in the formations in a plane substantially perpendicular to a bedding plane of the formations based on the first induced voltage, the second induced voltage, and the rotated tensor component, wherein the value of the fracture orientation indicator is calculated based at least in part on a difference between a multiple of the rotated tensor component and a sum of the first induced voltage and the second induced voltage; and calculate a value of a vertical fracture indicator indicative of a magnitude of effect of the fracture based on the first induced voltage, the second induced voltage, and the value of the fracture orientation indicator.

18. The system of claim 17 wherein the voltage—at least one multi-axial electromagnetic transmitter comprises a tri-axial electromagnetic transmitter, and the at least one multi-axial electromagnetic receiver comprises a tri-axial electromagnetic receiver.

19. The system of claim 17 wherein the processor is configured to determine the rotated tensor component by rotating the second induced voltage 45 degrees about the first axis, wherein the first axis is substantially parallel to a fracture plane.

20. The system of claim 17 wherein the at least one multi-axial electromagnetic transmitter and the at least one multi-axial electromagnetic receiver are disposed on a logging while drilling instrument.

* * * * *